2 Sheets—Sheet 1.
J. C. JEWETT.
REFRIGERATOR.
No. 7,340. Reissued Oct. 10, 1876.
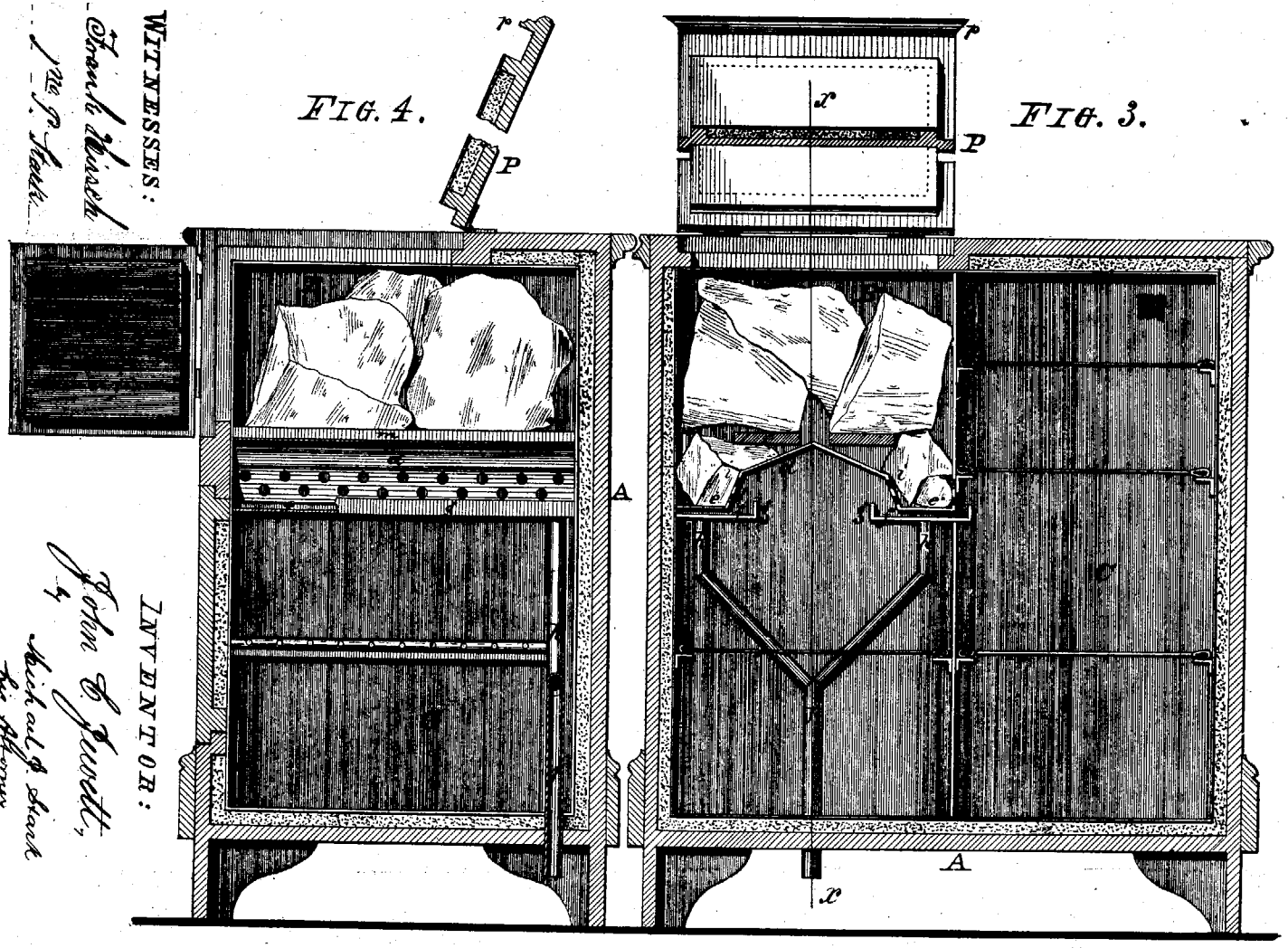
WITNESSES:
Frank Hirsch
Wm. P. Stark
INVENTOR:
John C. Jewett,
by Michael J. Stark
his Attorney
THE GRAPHIC CO. N.Y.

2 Sheets—Sheet 2.

J. C. JEWETT.

REFRIGERATOR.

No. 7,340. Reissued Oct. 10, 1876.

WITNESSES:

Frank Kusch

Jno. P. Stark.

INVENTOR:

John C. Jewett, by Michael J. Stark his Attorney.

THE GRAPHIC CO. N.Y.

UNITED STATES PATENT OFFICE.

JOHN C. JEWETT, OF BUFFALO, NEW YORK.

IMPROVEMENT IN REFRIGERATORS.

Specification forming part of Letters Patent No. 69,812, dated October 15, 1867; reissue No. 7,340, dated October 10, 1876; application filed May 26, 1876.

*To all whom it may concern:*

Be it known that I, JOHN C. JEWETT, of Buffalo, in the county of Erie and State of New York, have invented certain new and useful Improvements on Refrigerators; and I do hereby declare that the following description, taken in connection with the accompanying sheets of drawings, forms a full, clear, and exact specification.

The first part of my invention relates to the construction of the ice-chamber; and it consists in the arrangement therewith of an arched bottom having perforated supports, forming, in conjunction with horizontal bases, depressions for the reception of the water resulting from the melting of the ice, and smaller fragments of the same, said depressions being in communication with shallow pans placed below said depressions, and arranged to convey the drippings to the exterior of said ice-chamber through suitably-arranged waste-pipes leading to the outside of the refrigerator. By this arrangement a large refrigerating-surface is exposed to the air contained in the provision-chamber, and the temperature thereof kept reduced by contact with the drippings, small fragments of ice, and large conducting-surface of the ice-chamber without circulating around the larger mass of ice.

The second part of my invention consists in the arrangement, with the ice-chamber, of two doors constructed in such manner as to present a large and unobstructed opening in said ice-chamber, to facilitate the introduction of the ice into said chamber, and for easier access to it thereafter.

The third part of my invention consists in the arrangement, with the vertically-swinging door placed into the top of the ice-chamber, of an overlapping flange to keep the horizontally-swinging door securely closed, and thereby to compel the opening of the former, for introducing and removing articles to and from the ice-chamber.

The particulars of construction of my improved refrigerator will hereinafter more fully appear, in order to enable others skilled in the art to which it appertains to make and use the same.

Figure 1:
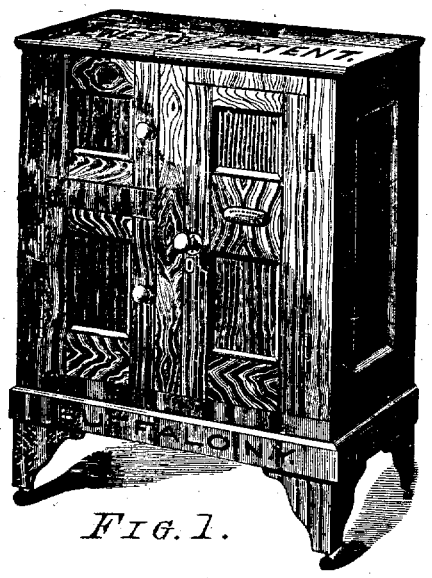
Figure 2:
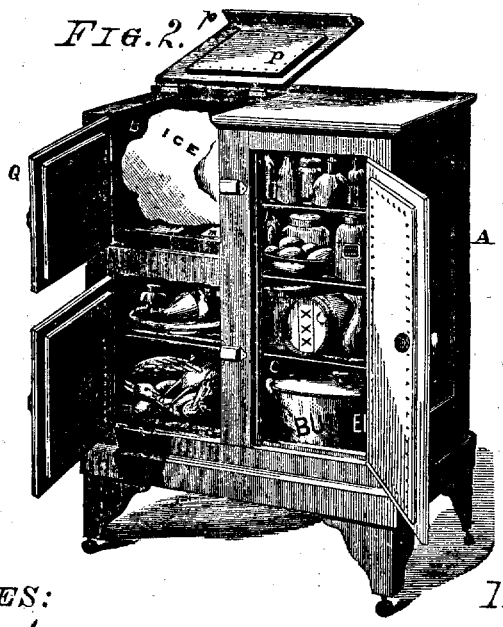

In the hereinbefore-mentioned drawings, Figure 1 is a perspective view of my refrigerator. Fig. 2 is a similar view, showing the arrangement of the doors in the ice-chamber. Fig. 3 is a vertical longitudinal section, and Fig. 4 a vertical transverse section in line *x x* of Fig. 3.

Like letters of reference indicate corresponding parts in all the figures.

A are the walls of a refrigerator, provided with an inner metallic sheathing and a lining of a suitable non-conducting material, such as charcoal, sawdust, or the like. B is the ice-chamber, placed in the upper portion at one end; and C, the provision-chamber. The bottom of the ice-chamber is constructed with an arched or elevated portion, *d*, at the center, leaving depressed spaces *e e'* at each side. Shallow pans or troughs *f f* are provided immediately below these depressions, of sufficient width to receive the drippings resulting from the melting of the ice through the perforations *i i*. These troughs connect at their rear end with branches *h h* of the waste-pipe *j*, by which the water is conducted away. Above or on each side of the top of the arch are provided two or more rack-bars, *m*, which support the larger masses of the ice.

For the purpose of introducing the ice in the ice-chamber, I construct the same in such manner that portions (or the whole) of two of its sides are removable, so that when removed an unobstructed passage for the ice is obtained. I accomplish this by arranging a door, Q, in the front part, and a similar door, P, in the upper part of said ice-chamber, both being arranged in relation to each other, that when opened the front side and adjacent portion of the top are entirely unobstructed, and admit a larger block of ice with less trouble than can otherwise be passed into the ice-box. These blocks need, furthermore, not be elevated much, if any, above the rack upon which they are to rest, thus preventing, to a great extent, the handling of the cold blocks, and chipping them to fit a comparatively smaller passage for the same, if only one door were employed. This arrangement of making two of the sides of an ice-chamber removable is a decided improvement in refrigerators.

After the ice has been placed into the ice-chamber, access is frequently required thereto to obtain portions of the ice, or to place in or remove therefrom articles that are required to be suddenly cooled, or to be kept at a very low temperature. In accomplishing this it is desirable to prevent as much as possible the escape of the cold air, which is best avoided by opening an aperture in the top of the said ice-chamber. I have, therefore, constructed the removable sides in such manner that by locating one of them in the top I obtain this desired result; but, to compel the person or persons using my refrigerators to operate the top door in preference to the side door, I have provided said top door P with a downwardly-projecting flange, *p*, overlapping the front door Q. In this manner the front door cannot be opened unless the top door is first raised sufficiently to liberate said front door, and the user of my refrigerator will thereby soon become accustomed to operate the top alone, except when introducing the ice. The advantages resulting from operating the top door exclusively for introducing or removing articles are, first, the cold air, being heavier, will prevent the exterior warmer stratum of air to enter from the top; second, a corresponding saving of the ice, and a comparatively cooler temperature in the provision-chamber; and, third, the arrangement with the flange on the top door enables me to dispense with catches for each or both doors, if desired. The large blocks of ice rest on the slats *m*, while the smaller fragments fall into the depressions *e e'*. These are provided with perforations on the sides *i i*, which serve the double purpose of allowing the air to circulate through, and the water resulting from the melting of the ice to escape. By constructing the ice-box with the arched bottom *d* and depressions *e e'*, I secure the several advantages of increasing the cooling-surface in contact with the air of the preserving-chamber, (a portion of that surface being duplicated by the shallow troughs *f f*, kept at the temperature of melting ice by the drippings;) of enabling the air contained in the refrigerator to circulate through the small fragments and drippings of the ice freely in every direction without rising to or circulating around the larger pieces lying upon the rack above, which are, in consequence, longer preserved from melting; and in the circulation of the air over the surface of the drip-pans, the contents of which are very little below the temperature of the ice itself, whereby, as experience has shown, the temperature is maintained several degrees lower than in any other refrigerator with which I am acquainted. The air, by circulating chiefly at the bottom of the ice-box and over the drippings before they escape, is refrigerated thereby, thus utilizing the waste-water, while the ice in the main body of the box, by being comparatively free from its influence, melts much slower than it otherwise would, which effects a considerable saving in the amount of ice required.

The refrigerative surface of the walls of the ice-chamber is so large that all moisture contained in the atmosphere of the chamber is condensed, and falls into the pans *f f*, producing and maintaining a state of dryness most conducive to the preservation of food.

Having thus fully described my invention, I desire to secure to me by Letters Patent of the United States—

1. A refrigerator having the ice-box situated at its top, said ice-box being provided with top and side doors, whereby free access to the ice-box is obtained, substantially as set forth.

2. The ice-chamber of a refrigerator constructed with an elevated bottom, *d*, in combination with legs or depressions *e e'*, provided with perforations *i i* and the shallow pans *f f*, arranged and operating as and for the purpose hereinbefore stated.

In testimony whereof I have hereunto set my hand in the presence of two subscribing witnesses.

JNO. C. JEWETT.

Witnesses:
MICHAEL J. STARK,
FRANK HIRSCH.